United States Patent
Pasuri et al.

(10) Patent No.: US 8,841,872 B2
(45) Date of Patent: Sep. 23, 2014

(54) METHOD AND ARRANGEMENT IN CONNECTION WITH ELECTRIC DEVICE SYSTEM

(75) Inventors: Osmo Pasuri, Ojakkala (FI); Reijo Kalevi Virtanen, Vantaa (FI); Jorma Keronen, Espoo (FI)

(73) Assignee: ABB Oy, Helsinki (FI)

( * ) Notice: Subject to any disclaimer, the term of this patent is extended or adjusted under 35 U.S.C. 154(b) by 660 days.

(21) Appl. No.: 13/086,971

(22) Filed: Apr. 14, 2011

(65) Prior Publication Data

US 2011/0254493 A1 Oct. 20, 2011

(30) Foreign Application Priority Data

Apr. 15, 2010 (FI) ...................................... 20105396

(51) Int. Cl.
*H02P 1/00* (2006.01)
*H02P 25/22* (2006.01)
*H02J 3/00* (2006.01)

(52) U.S. Cl.
CPC ................. *H02P 25/22* (2013.01); *H02J 3/005* (2013.01)
USPC ....... 318/500; 318/105; 318/400.26; 318/722

(58) Field of Classification Search
USPC .............. 318/105, 106, 700, 400.17, 400.26, 318/400.27, 400.29, 722, 727, 440, 500
See application file for complete search history.

(56) References Cited

U.S. PATENT DOCUMENTS

| | | | |
|---|---|---|---|
| 5,130,617 A * | 7/1992 | Oshima et al. .................. | 318/34 |
| 5,460,244 A | 10/1995 | Tanahashi | |
| 6,915,440 B2 | 7/2005 | Berglund et al. | |
| 6,936,983 B2 | 8/2005 | Kachouh et al. | |
| 7,043,663 B1 | 5/2006 | Pittelkow et al. | |
| 7,102,248 B2 * | 9/2006 | Wobben .......................... | 290/44 |
| 7,499,296 B2 * | 3/2009 | Baudesson et al. ............. | 363/37 |
| 7,518,279 B2 | 4/2009 | Chakrabarti et al. | |
| 7,535,738 B2 * | 5/2009 | Wei et al. ........................ | 363/71 |

(Continued)

FOREIGN PATENT DOCUMENTS

| | | |
|---|---|---|
| CN | 101355341 A | 1/2009 |
| EP | 1 796 254 A2 | 6/2007 |
| JP | 2008-228517 A | 9/2008 |

OTHER PUBLICATIONS

Search Report dated Feb. 13, 2012, issued in the corresponding European Patent Application No. 11160586.1. (7 pages).

(Continued)

*Primary Examiner* — Bentsu Ro
*Assistant Examiner* — Thai Dinh
(74) *Attorney, Agent, or Firm* — Buchanan Ingersoll & Rooney PC

(57) ABSTRACT

A method and arrangement in connection with an electric drive system are provided. The electric drive system includes an intermediate circuit with two or more supply units and two or more inverter units connected thereto, and an electric machine having two or more three-phase windings galvanically separated from each other. Two or more inverter units are connected to the three-phase windings. The arrangement also includes first main circuit switches to galvanically separate each supply unit from a supply, second main circuit switches to galvanically separate each supply unit from the intermediate circuit, first intermediate circuit switches to galvanically separate each inverter unit from the intermediate circuit, and second intermediate circuit switches to galvanically separate each inverter unit from the electric machine.

13 Claims, 2 Drawing Sheets

(56) References Cited

U.S. PATENT DOCUMENTS

| | | | | |
|---|---|---|---|---|
| 8,074,753 | B2* | 12/2011 | Tahara et al. | 180/65.21 |
| 8,299,732 | B2* | 10/2012 | Hoadley et al. | 318/105 |
| 8,482,230 | B2* | 7/2013 | Bouchez et al. | 318/376 |
| 8,604,730 | B2* | 12/2013 | Suzuki | 318/400.02 |
| 2005/0231152 | A1* | 10/2005 | Welchko et al. | 318/801 |
| 2006/0103137 | A1 | 5/2006 | Wobben | |
| 2009/0187282 | A1 | 7/2009 | Menke et al. | |
| 2011/0276279 | A1 | 11/2011 | Pasuri et al. | |

OTHER PUBLICATIONS

*Finnish Search Report dated Jan. 17, 2011.

For the Examiners Convenience: Office Action from the U.S. Patent and Trademark Office in the U.S. Appl. No. 13/102,564, mailed May 7, 2013, U.S. Patent and Trademark Office, Alexandria, VA.

Notification of the First Office Action issued on Oct. 12, 2013, by the Chinese Patent Office in corresponding Chinese Patent Application No. 201110096361.7, and an English Translation of the Office Action. (17 pages).

* cited by examiner

METHOD AND ARRANGEMENT IN CONNECTION WITH ELECTRIC DEVICE SYSTEM

RELATED APPLICATION

This application claims priority under 35 U.S.C. §119 to Finnish Patent Application No. 20105396 filed in Finland on Apr. 15, 2010, the entire content of which is hereby incorporated by reference in its entirety.

FIELD

The present disclosure relates to electric drive systems. More particularly, the present disclosure relates to electric drive systems in which an electric machine of a system is driven by a plurality of parallel inverter units.

BACKGROUND INFORMATION

It is known in the art to control an electric machine by a frequency converter consisting of a plural number of supply and inverter units connected to a common direct voltage intermediate circuit. Some of the units may be provided with a separate unit-specific control, while others, inverter units for example, may be controlled by a common control. The common control in question may be implemented, for example, by branching the control of one control unit to a plurality of inverter units with a separate branching unit.

Parallelism may also appear in other features of an electric drive system. For example, an electric machine may have a plurality of windings galvanically separated from one another, where each winding of the electric machine is controlled by a separate inverter unit. Likewise, a supply may consist of a plurality of supply transformers or a supply transformer provided with a plurality of secondary windings.

However, in the above arrangements, a malfunction in one of the system units may bring the entire system into a halt.

SUMMARY

An exemplary embodiment of the present disclosure provides a method in connection with an electric drive system. The electric drive system includes an intermediate circuit having two or more supply units and two or more inverter units connected thereto. The electric drive system also includes an electric machine having two or more three-phase windings galvanically separated from one another and coupled to two or more inverter units. The supply units and the inverter units are separable units. The exemplary method includes the step of configuring an electric drive system by separating one or more separable units. The separating of the one or more separable units includes at least one of galvancially separating the supply units from a supply and the intermediate circuit, and galvanically separating the inverter units from the intermediate circuit and the electric machine.

An exemplary embodiment of the present disclosure provides an arrangement in connection with an electric drive system. The electric drive system includes an intermediate circuit having two or more supply units and two or more inverter units connected thereto. The electric drive system also includes an electric machine having two or more three-phase windings galvanically separated from one another and having two or more inverter units arranged in association with the two or more three-phase windings. The exemplary arrangement includes first main circuit switches for galvanically separating each supply unit from a supply, respectively. The exemplary arrangement includes second main circuit switches for galvanically separating each supply unit from the intermediate circuit, respectively. The exemplary arrangement also includes first intermediate circuit switches for galvanically separating each inverter unit from the intermediate circuit, respectively. In addition, the exemplary arrangement includes second intermediate circuit switches for galvanically separating each inverter unit from the electric machine.

BRIEF DESCRIPTION OF THE DRAWINGS

Additional refinements, advantages and features of the present disclosure are described in more detail below with reference to exemplary embodiments illustrated in the drawings, in which.

DETAILED DESCRIPTION

Exemplary embodiments of the present disclosure provide a method and arrangement in connection with electric drive systems in which an electric machine of a system is driven by a plurality of parallel inverter units. The exemplary method and arrangement of the present disclosure resolve the above-noted drawbacks of known techniques.

Exemplary embodiments of the present disclosure are based on the concept in which an electric drive is composed of modular sub-entities that may be disconnected from a main circuit in a desired manner. Further, if an electric machine is provided with a plural number of windings galvanically separated from one another, the electric machine may be controlled even when parts of the configuration are disconnected.

An intelligent electric drive control of the present disclosure provides a more reliable possibility for continuing the execution of a process. Exemplary embodiments of the present disclosure provide better fault tolerance than an inverter and supply unit fixedly connected to an intermediate circuit and an electric machine. A faulted sub-entity may be separated from the rest of the arrangement and replaced without having to shut down the entire system. In addition, if a winding of the electric machine is damaged, it may be separated from the inverter unit, and the machine may still be driven with the remaining windings.

Figure 1:
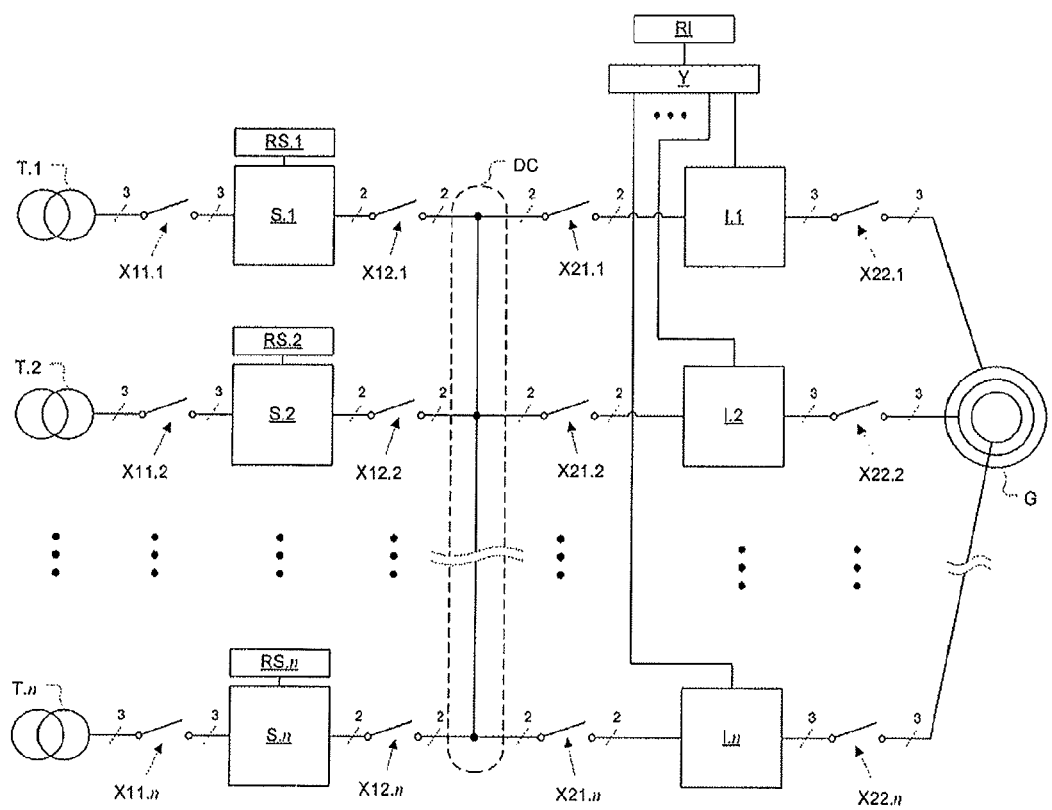
FIG. 1 is a simplified block diagram of an arrangement of the disclosure in connection with an electric drive system according to an exemplary embodiment of the present disclosure.

FIG. 1 is a simplified block diagram of an exemplary arrangement in connection with an electric drive system, according to an embodiment of the present disclosure. The exemplary arrangement includes an intermediate circuit DC to which two or more supply units S.1-S.n (n≥2) and two or more inverter units I.1-I.n are connected, and an electric machine G with two or more three-phase windings galvanically separated from one another. This main circuit coupling has a common intermediate circuit DC to which all the supply units and inverter units of the system are connected. Also, arrangements with a plural number of intermediate circuits are possible.

In addition, the exemplary arrangement includes first intermediate circuit switches X21.1-X21.$n$ for galvanically separating each inverter unit I.1-I.n from the intermediate circuit DC, and second intermediate circuit switches X22.1-X22.$n$ for galvanically separating each inverter unit I.1-I.n from the electric machine G. If one of the inverter units I.1-I.n malfunctions, the unit in question can be galvanically separated from the rest of the system, thereby enabling the system to continue functioning with the remaining inverter and supply units.

The galvanic separation also allows a damaged inverter unit to be detached from the cabin, repaired, replaced and coupled back to drive while the system is running. Likewise, when one of the three-phased windings of the electric machine G malfunctions, it may be separated from the inverter unit, and the remaining windings may continue the operation at a reduced power.

The inverter units I.1-I.n are controlled by a common control means RI. The connection between the control unit RI and the inverter units I.1-I.n is established by a branching device Y. Each inverter unit I.1-I.n may include one, or more inverter modules. When a plurality of inverter modules are used, a separate control connection is branched for each inverter module. The control unit RI is provided with parameters so that it is operated by a selected number of inverter units/modules.

By controlling the first intermediate circuit switches X21.1-X21.$n$ and the second intermediate circuit switches X21.1-X21.$n$ so that some of them are open while others are closed, it is also possible to connect a different number of inverter units to the main circuit, when necessary, to control the windings of the electric machine G. Each inverter unit I.1-I.n and a supply unit S.1-S.n forming a pair are controlled in a similar manner to allow power to be transferred to the mains in generator applications or to draw it from the mains in motor applications.

The exemplary arrangement further includes first main circuit switches X11.1-X11.$n$ for separating each supply unit S.1-S.n from the supply, and second main circuit switches X12.1-X12.$n$ for separating each supply unit S.1-S.n from the intermediate circuit DC. Each supply unit S.1-S.n is provided with a separate control unit RS.1-RS.n. Similarly, as inverter units, the supply units S.1-S.n may have power modules connected in parallel.

If a supply unit malfunctions due to a short circuit in the main circuit, for example, the malfunctioning supply unit can be separated from the main circuit with the first main circuit switches X11.1-X11.$n$ and the second main circuit switches X12.1-X12.$n$ and, consequently, the drive may be continued with the remaining inverter and supply units.

In the exemplary arrangement of the present disclosure, each supply unit S.1-S.n may have three-phased supply transformers T.1-T.n connected thereto, as for example in FIG. 1. The exemplary arrangement of the present disclosure may also be implemented with one three-phase transformer having a number of secondary windings corresponding to that of the supply units S.1-S.n in each phase as a supply transformer. If a supply associated with the supply unit malfunctions, the supply in question may be separated from the system of the disclosure.

In other words, the system of the present disclosure enables separation of any one or any of faulted elements: supply transformers T.1-T.n, supply units S.1-S.n, inverter units I.1-I.n and motor G windings.

Figure 2:
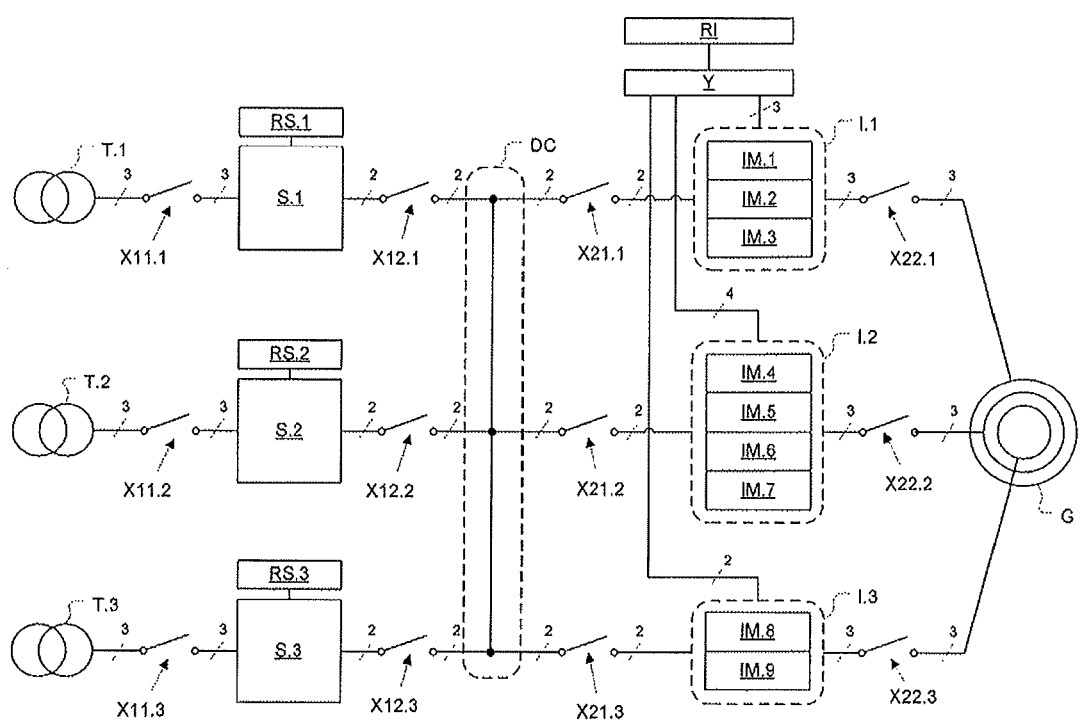
FIG. 2 shows an exemplary embodiment of the present disclosure in which an electric machine G is provided with three three-phase windings galvanically separated from one another.

FIG. 2 shows an exemplary embodiment of the present disclosure where an electric machine G has three three-phase windings galvanically separated from one another. This improves the fault resistance of the machine. If one of the three-phase windings of the electric machine G is damaged, the damaged winding may be separated from the inverter unit and the operation may possibly be continued with the remaining windings at two thirds of the power. If two of the windings are damaged, the operation may be continued by one winding and at one third of the power.

In the exemplary embodiment of FIG. 2, the inverter units I.1-I.3 include two to four inverter modules IM.1-IM.9. The inverter modules IM.1-IM.9 are controlled by a control unit RI by establishing connections from the control unit RI to each inverter module IM.1-IM.9 with an electric branching unit Y.

According to an exemplary embodiment of the present disclosure, the arrangement further includes first intermediate circuit switches X21.1-X21.3 for galvanically separating each inverter unit I.1-I.3 from the intermediate circuit DC, second intermediate circuit switches X22.1-X22.3 for galvanically separating each inverter unit I.1-I.3 from the electric machine G, first main circuit switches X11.1-X11.3 for separating each supply unit S.1-S.3 from the supply units T.1-T.3, and second main circuit switches X12.1-X12.$n$ for separating each supply unit S.1-S.3 from the intermediate circuit DC. In other words, faulted supply transformers T.1-T.3, supply units S.1-S.3, inverter units I.1-I.3 and/or motor windings G may be separated from the system and yet the possibility to drive the system is maintained.

Each supply unit S.1-S.3 is controlled by a separate control unit RS.1-RS.3.

Various elements of the exemplary embodiments were described above as "means" for conciseness of explanation. It is to be understood that each of the means elements described herein can be constituted by appropriately configured hardware (analog and/or digital) elements for carrying out their respective functions as described. The hardware elements constituting the various means elements of the present disclosure can also be implemented by a computer processor programmed to carry out the respective functions of the various elements. In this case, the computer processor is configured to execute a computer program tangibly recorded on a non-transitory computer-readable recording medium (e.g., non-volatile memory such as ROM, hard disk, drive, optical memory, flash memory, etc.).

A person skilled in the art will find it apparent that as technology advances, the basic idea of the present disclosure may be implemented in various ways. The present disclosure and its embodiments are therefore not restricted to the above examples but may vary within the scope of the claims.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method in connection with an electric drive system, the electric drive system including:
    an intermediate circuit having two or more supply units and two or more inverter units connected thereto; and
    an electric machine having two or more three-phase windings galvanically separated from one another and coupled to two or more inverter units, wherein the supply units and the inverter units are separable units, the method comprising the step of
    configuring an electric drive system by separating one or more of the separable units,
    wherein the separating of the one or more separable units comprises at least one of galvanically separating the supply units from a supply and the intermediate circuit, and galvanically separating the inverter units from the intermediate circuit and the electric machine.

2. An arrangement in connection with an electric drive system, the electric drive system including:
   an intermediate circuit having two or more supply units and two or more inverter units connected thereto; and
   an electric machine having two or more three-phase windings galvanically separated from one another and having two or more inverter units arranged in association with the two or more three-phase windings, wherein the arrangement comprises:
   first main circuit switches for galvanically separating each supply unit from a supply, respectively;
   second main circuit switches for galvanically separating each supply unit from the intermediate circuit, respectively;
   first intermediate circuit switches for galvanically separating each inverter unit from the intermediate circuit, respectively; and
   second intermediate circuit switches for galvanically separating each inverter unit from the electric machine.

3. The arrangement according to claim 2, wherein each supply unit is configured to be controlled by a separate control unit.

4. The arrangement according to claim 3, wherein each inverter unit comprises one or more inverter modules.

5. The arrangement according to claim 4, wherein the inverter units are each configured to be controlled by one and the same control unit.

6. The arrangement according to claim 5, wherein the connection between the control unit and the inverter units is formed with a branching device.

7. The arrangement according to claim 6, wherein the arrangement further comprises one or more supply transformers.

8. The arrangement according to claim 7, wherein the supply transformer of the arrangement comprises two or more secondary windings arranged in association with two or more inverter units.

9. The arrangement according to claim 2, wherein each inverter unit comprises one or more inverter modules.

10. The arrangement according to claim 2, wherein the inverter units are each configured to be controlled by one and the same control unit.

11. The arrangement according to claim 10, wherein the connection between the control unit and the inverter units is formed with a branching device.

12. The arrangement according to claim 2, wherein the arrangement further comprises one or more supply transformers.

13. The arrangement according to claim 12, wherein the supply transformer of the arrangement comprises two or more secondary windings arranged in association with two or more inverter units.

\* \* \* \* \*